Dec. 23, 1969　　　　　　　R. G. HUGHES　　　　　　3,485,165
SILK-SCREENING FRAME
Filed Jan. 8, 1968　　　　　　　　　　　　　2 Sheets-Sheet 1
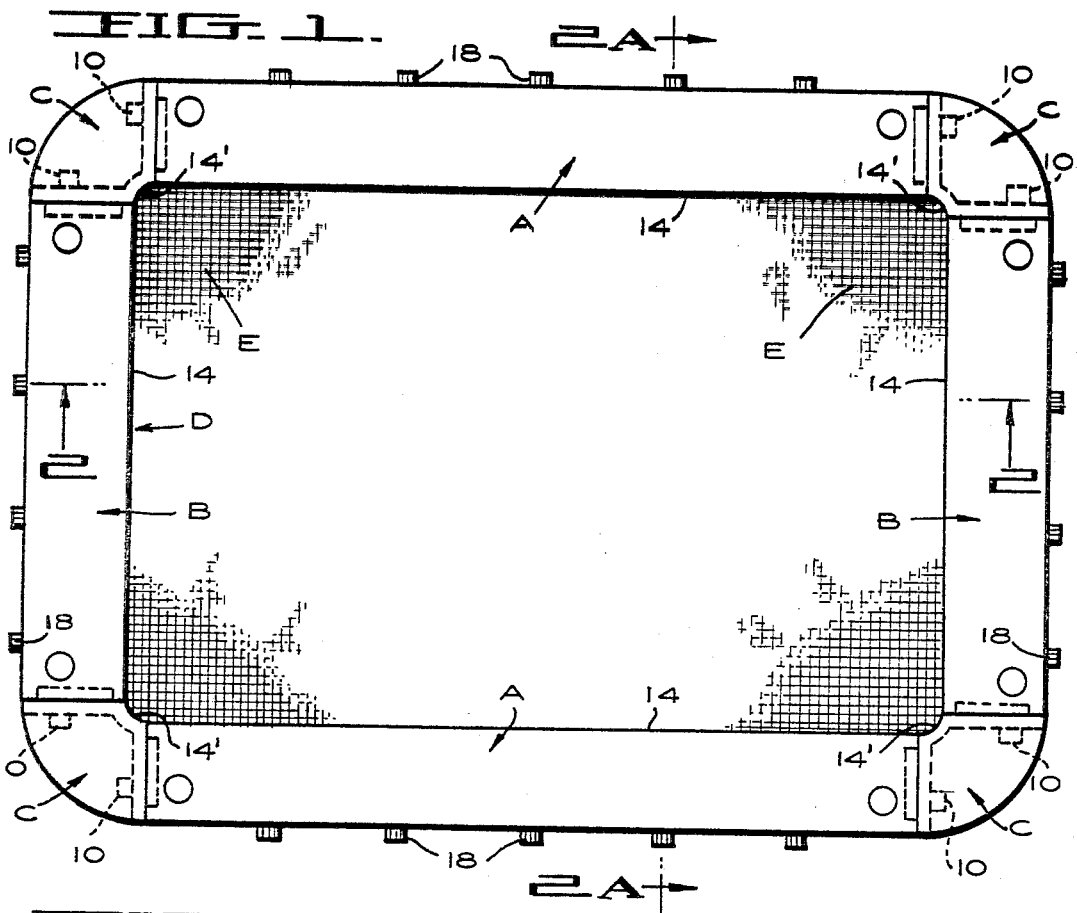
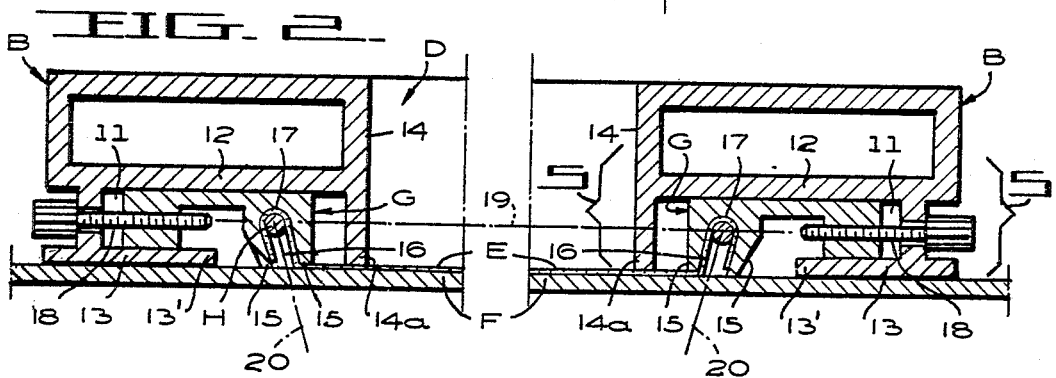
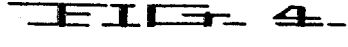
INVENTOR.
RICHARD G. HUGHES
BY Joseph F. Cole
ATTORNEYS Dec. 23, 1969   R. G. HUGHES   3,485,165
SILK-SCREENING FRAME
Filed Jan. 8, 1968   2 Sheets-Sheet 2
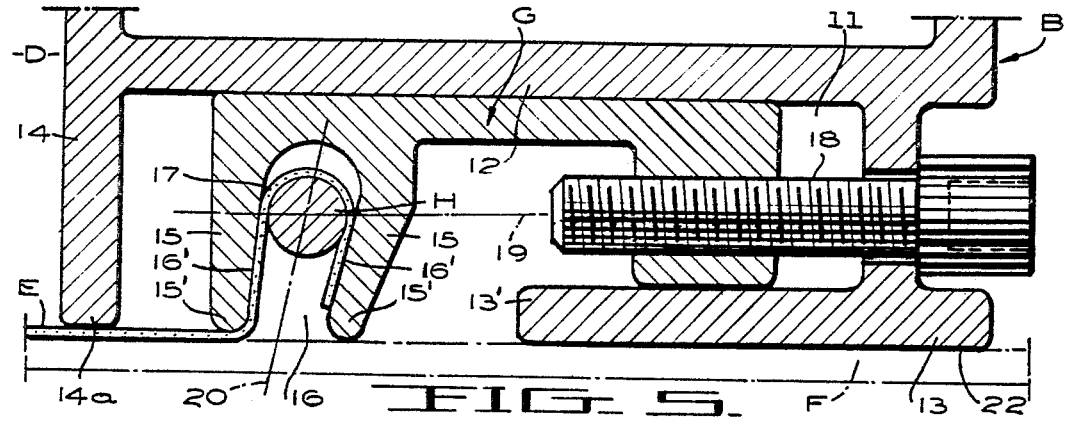
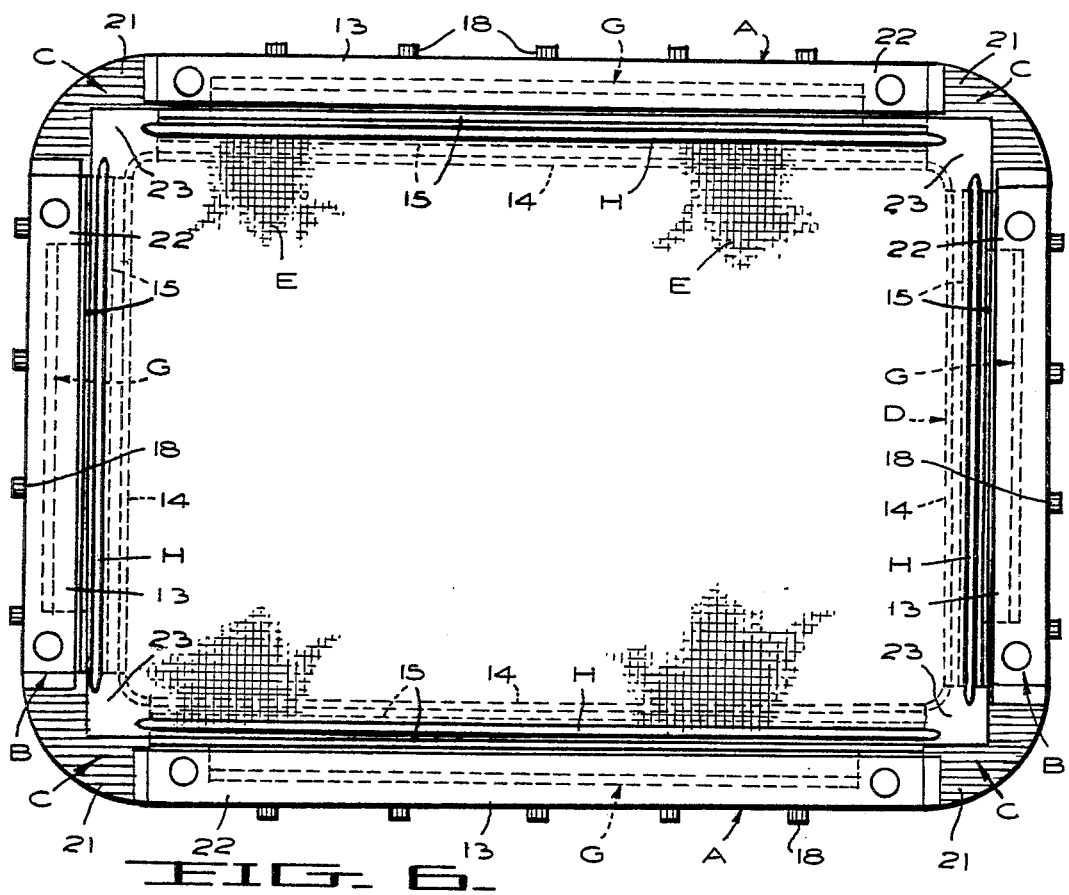
INVENTOR.
RICHARD G. HUGHES
BY
*Joseph F. Cole*
ATTORNEYS United States Patent Office 3,485,165
Patented Dec. 23, 1969

3,485,165
SILK-SCREENING FRAME
Richard G. Hughes, % Barnaby Company, 1690 Plymouth
St., Mountain View, Calif. 94040
Filed Jan. 8, 1968, Ser. No. 696,286
Int. Cl. B41l *13/00;* A47g *5/00;* A47h *13/00*
U.S. Cl. 101—127.1                                      7 Claims

ABSTRACT OF THE DISCLOSURE

A silk-screening frame having longitudinal and transverse frame members providing a rectangular-shaped frame structure defining a central well, with a silk screen stretched across the bottom of this well and through which pigment may be pressed to form a given design. Each frame member has a slide guided thereby for movement toward and away relative to the well, and each slide has a groove therein for receiving the adjacent marginal edge portion of the screen, the groove being formed with converging fingers into which an anchor pin is inserted to hold the screen to the guide. The slides are guided relative to their respective frame members so that the slides are prevented from twisting out of alignment.

SUMMARY

It is proposed in this invention to provide a silk-screening frame having longitudinal and transverse frame members arranged to define a rectangular-shaped frame structure with a central well, with a screen being stretched across the bottom of the well. The marginal edge portions of the screen may be readily secured to slides that are carried by the frame members. Upon retracting these slides away from the central well, the screen may be stretched taut; however, upon advancing the slides toward the well, the screen may be easily removed from the frame structure. Moreover, it is proposed to guide the slides in such a manner that they will not twist out of alignment.

More specifically stated, it is proposed to provide each slide with a pair of spaced fingers defining a tapered groove therebetween, each groove having confronting walls that converge relative to one another toward the tips of the fingers. The marginal edge portions of the screen are looped back upon themselves, and these loops are inserted into the grooves of the slides. Then anchor pins are inserted through the loops, and the pins are dimensioned to lock the marginal edge portions of the screen against the converging walls of the fingers when the slides are retracted relative to the central wall. Upon reversing the direction of movement of the slides, the marginal edge portions of the screen will be released for removal from the slides.

Other objects and advantages will appear as the specification proceeds, and the novel features of the invention will be particularly pointed out in the appended claims.

BRIEF DESCRIPTION OF THE DRAWINGS

For a better understanding of the invention, reference should be had to the accompanying drawings, forming part of this specification, in which:

FIG. 1 is a top plan view of my silk-screening frame;

FIG. 2 is an enlarged fragmentary sectional view taken along the longitudinal plane 2—2 of FIG. 1, it being noted that a transverse sectional view taken along the plane 2A—2A of FIG. 1 will be identical to that shown in FIG. 2;

FIGS. 3 and 4 are elevational views of longitudinal and transverse anchor pins, respectively;

FIG. 5 is an enlarged sectional view of that portion included within the brackets 5—5 of FIG. 2; and FIG. 6 is a bottom plan view of the silk-screening frame.

DESCRIPTION OF THE PREFERRED EMBODIMENT

Referring now to the drawings in detail, it will be noted that a rectangular-shaped frame structure defines a pair of spaced longitudinal frame members A and a pair of spaced transverse frame members B, and further defining corner brackets C interconnecting adjacent ends of the frame members A and B, for instance, bolts 10 may be used for this purpose (see FIG. 1). The frame structure provides a central well D, as shown in FIGS. 1, 2 and 6 of the drawings.

A silk screen E, or the like, is stretched across the bottom of the central well D and through which pigment may be pressed from the well by a squeegee (not shown) to form a given design on a surface F that is positioned under the frame structure (see FIGS. 2 and 5). This is well known in the art of silk-screen printing.

Each of the frame members A and B is formed with a guideway 11, and a slide G is guided in each guideway for movement toward and away from the well D. Each guideway 11 has upper and lower guide rails 12 and 13, respectively, that are horizontally disposed when the screen E rests against the surface F (see FIGS. 2 and 5).

The frame members A and B and the corner brackets C are provided with substantially vertical inner walls 14 and 14', respectively, that contact at their lower ends with the screen E. Each lower guide rail 13 has an inner edge 13' spaced outwardly relatively to the lower end 14a of the adjacent inner wall 14 of its respective frame member (A or B) to provide a space therebetween through which a marginal edge portion of the screen E extends (see FIGS. 2 and 5).

As an important structural feature, each slide G is formed with a pair of spaced fingers 15 that define a tapered groove 16 therebetween, each groove defining confronting walls 16' converging relative to one another in a direction toward tips 15' of the fingers (see FIG. 5). Each pair of fingers 15 have their tips 15' positioned in the space between the inner edge 13' of the lower guide rail 13 and the vertical inner wall 14 of their respective frame member (A or B).

The marginal edge portions of the screen E are looped back upon themselves (see FIGS. 2 and 5) but unsecured thereto, and each screen loop 17 is removably inserted into the groove 16 of the adjacent slide G. Anchor pins H are removably inserted through the loops 17 of the screen E within the grooves 16 of the slides G, and these pins are dimensioned so that they will lock the marginal edge portions of the screen against the converging walls 16' of the fingers 15, when these pins are drawn toward the tips 15' of the fingers upon retracting the slides G relative to the central well D (see FIG. 5). The fingers 15 extend the full length of the slides G (see FIG. 6).

For the purpose of retracting and advancing the slides G with respect to the central well D, thereby drawing the screen E taut and to release the screen, respectively, a plurality of screws 18 are provided. These screws are arranged substantially midway between the upper and lower guide rails 12 and 13, respectively, and on substantially the same horizontal plane 19 as the anchor pins H, whereby the slides G will be held against twisting out of alignment relative to the upper and lower guide rails when the screws are tightened (see FIGS. 2 and 5).

It will be observed that the central longitudinal planes 20 of the grooves are inclined and slope slightly with respect to vertical in directions toward the lower ends 14a of the vertical inner walls 14 of the frame members (A or B) to thus facilitate passage of the marginal edge portions of the screen E over the lower ends 14a of these inner walls from the central well D to the slide grooves 16. As shown in FIGS. 2 and 5, the fingers 15 on each slide G are arranged so that one will be inboard and the other outboard. The tips 15' of the inboard fingers bear against the screen E, while the outboard fingers bear against the underlying surface F; also, this surface is contacted by the lower rails 13.

Turning now to FIG. 6, it will be apparent that each slide G and its anchor pin H have substantially the same longitudinal lengths as the frame members (A or B) adjacent thereto. The fingers 15 extend the full lengths of the slides. The anchor pins H for the longitudinal frame members A and the transverse frame members B are shown in FIGS. 3 and 4, respectively.

The underneath surfaces 21 of the corner brackets C, which are shaded in FIG. 6, are disposed at elevations above the underneath surfaces 22 of the lower guide rails 13, thus providing spaces into which the corner portions of the screen E are positioned.

I claim:

1. In a silk-screening frame:
   (a) a rectangular-shaped frame structure defining a pair of spaced longitudinal frame members and a pair of spaced transverse frame members, and further defining corner brackets interconnecting adjacent ends of these frame members, the frame structure providing a central well;
   (b) a silk screen, or the like, stretched across the bottom of this well and through which pigment may be pressed from the well to form a given design on a surface that is positioned under the frame structure;
   (c) each of the frame members being formed with a guideway, and a slide guided in each guideway for movement toward and away from the well;
   (d) each guideway having upper and lower guide rails that are horizontally disposed when the screen rests against said surface under the frame structure;
   (e) the frame members and corner brackets being provided with substantially vertical inner walls, the latter contacting with the screen;
   (f) each lower guide rail having an inner edge spaced outwardly relative to the lower end of the adjacent inner wall of its respetcive frame member to provide space therebetween through which a marginal edge portion of the screen extends;
   (g) each slide being formed with a pair of spaced fingers that define a tapered groove therebetween, each groove defining confronting walls converging relative to one anotnher in a direction toward tips of the fingers, and each pair of fingers having their tips positioned in the space between the inner edge of the lower guide rail and the vertical inner wall of their respective frame member;
   (h) the marginal edge portions of the screen being looped back upon themselves but unsecured thereto, and each screen loop being removably inserted into the groove of the adjacent slide;
   (i) anchor pins removably inserted through the loops of the screen within the grooves of the slides, and these pins being dimensioned so that they will lock the marginal edge portions of the screen against the converging walls of the fingers, when the pins are drawn toward the tips of the fingers upon retracting the slides relative to the central well;
   (j) and means operable to retract and advance the slides with respect to the central well to thereby draw the screen taut and to release the screen, respectively.

2. The silk-screening frame, as set forth in claim 1;
   (k) and in which the central longitudinal planes of the grooves betwen the fingers slope slightly with respect to vertical in directions toward the lower ends of the substantially vertical inner walls of the frame members to thus facilitate passage of the marginal edge portions of the screen over said lower ends of these walls from the central wall to the slide grooves.

3. The silk-screening frame, as set forth in claim 1;
   (k) and in which the said means is provided by a plurality of screws that are arranged substantially midway between the upper and lower guide rails and on substantially the same horizontal plane as the anchor pins, whereby the slides will be held against twisting out of alignment relative to the upper and lower guide rails when the screws are tightened to draw the screen taut.

4. The silk-screening frame, as set forth in claim 1;
   (k) and in which one finger on each slide is arranged inboard and the other outboard relative to the slide, the tip of the inboard finger being positioned to bear against the screen, while the tip of the outboard finger is positioned to bear against said surface underlying the frame structure.

5. The silk-screening frame, as set forth in claim 4;
   (l) and in which the underneath surfaces of the lower guide rails are positioned to bear against said surface underlying the frame sturcture.

6. The silk-screening frame, as set forth in claim 1;
   (k) and in which each slide and its anchor pin have substintially the same longitudinal lengths as their respective frame members.

7. The silk-screening frame, as set forth in claim 1;
   (k) and in which the corner brackets have underneath surfaces that are disposed at elevations above underneath surfaces of the lower guide rails, thus providing spaces to receive corner portions of the screen.

References Cited

UNITED STATES PATENTS

| | | | |
|---|---|---|---|
| 2,545,277 | 3/1951 | Hannah et al. | 101—127.1 |
| 2,565,218 | 8/1951 | Freeborn | 101—127.1 |
| 2,903,967 | 9/1959 | Levin | 101—127.1 |
| 2,693,205 | 11/1954 | Coulter. | |
| 3,078,793 | 2/1963 | Jaffa et al. | 101—127.1 |

FOREIGN PATENTS 1,041,819   9/1966   Great Britain.

ROBERT E. PULFREY, Primary Examiner

E. H. EICKHOLT, Assistant Examiner

U.S. Cl. X.R.

160—375, 378, 395